March 20, 1951     E. C. HARTWIG     2,545,998
WELDING CURRENT REGULATOR
Filed May 8, 1948
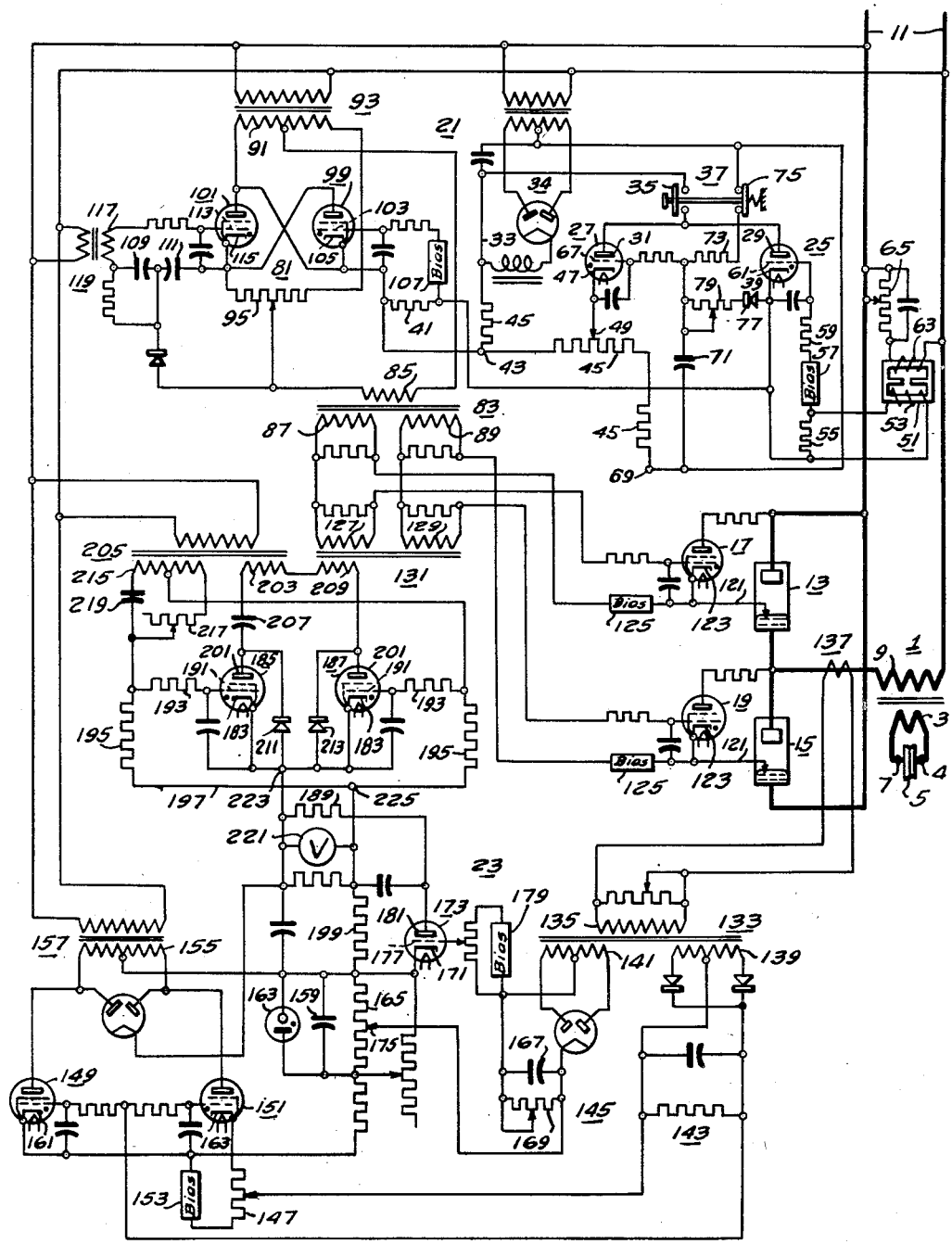
WITNESSES:
INVENTOR
Edward C. Hartwig.
BY
ATTORNEY Patented Mar. 20, 1951

2,545,998

UNITED STATES PATENT OFFICE 2,545,998

WELDING CURRENT REGULATOR

Edward C. Hartwig, Towanda, N. Y., assignor to Westinghouse Electric Corporation, East Pittsburgh, Pa., a corporation of Pennsylvania Application May 8, 1948, Serial No. 25,932

21 Claims. (Cl. 315—246)

My invention relates to electric discharge apparatus, and it has particular relation to control apparatus for precision welding.

My Patent 2,431,248, issued November 18, 1947 and assigned to Westinghouse Electric Corporation is illustrative of the prior art relating to my invention. In this application a welding system is disclosed in which current for welding is supplied in discrete pulses from an alternating current source through a pair of ignitrons connected in anti-parallel between the source and a welding transformer. The duration of the welding current is set in terms of half periods of the source and is determined by an electronic timer. The system includes a regulator for maintaining the amplitude of the welding current uniform in spite of fluctuations in the source potential and in the work resistance. The parameter for producing the regulating effect is derived by comparing a potential dependent on the load current with a standard potential derived from the electronic timer.

For many purposes the system disclosed in my Patent 2,431,248 serves adequately. I have found that under certain circumstances, particularly when the welding interval has a duration of a relatively few periods of the supply, portions of the welded material are not properly united. A similar situation arises when the load is highly inductive and the power factor is small.

It is, accordingly, an object of my invention to provide a control for a welding system by the cooperation of which with the welding system sound welds shall be produced.

A more specific object of my invention is to provide a welding system which shall operate with constant welding current in spite of load and source fluctuations in such manner that welds of good quality shall be produced.

An ancillary object of my invention is to provide a regulator for a welding system which shall cooperate with the components of the system to produce uniformly sound welds of good quality in spite of fluctuations of the source and variations in the material to be welded.

Another ancillary object of my invention is to provide a novel regulator for maintaining current flow through a load uniform in spite of source and load fluctuations.

My invention arises from the realization that defective welds are produced with apparatus such as is disclosed in my Patent 2,431,248 by reason of the fact that excessive current flows during the initial half periods of many welds. The difficulty arises from the fact that the regulating parameter is derived by comparing a potential component produced by the electronic timer, which appears immediately at the beginning of each weld, with a potential component dependent on the welding current, which does not appear until welding current flows. The effect of the timer potential alone is to maintain the welding current at a maximum. During the weld this effect is counteracted by the potential dependent on the welding current. At the beginning of the weld, the counteracting potential is not impressed and initially the welding current is, therefore, excessive. The effect of this excessive current is particularly marked, in situations in which the welding interval is of short duration, for example, of the order of three or four half periods of the supply.

That the initial current may be prohibitively high may be understood from a consideration of the mechanism of the regulating process.

In accordance with the usual practice of the invention disclosed in my Patent 2,431,248, the current flow through the welder is varied by rendering the ignitrons conductive at different instants in the half periods of the supply. The regulating component derived from the timer tends to cause the ignitrons to become conductive early in the first half periods of the welding interval; the regulating component dependent on the welding current counteracts this tendency. In the initial half periods of the welds the ignitrons are accordingly rendered conductive early. A welding transformer is highly inductive and a welding system has a relatively low power factor. When conductivity through this highly inductive transformer is started early in half periods of a source substantial transients are produced. Not only is the material to be welded overheated but because of the unbalanced current which may flow for different transients the transformer becomes saturated.

In accordance with my invention I provide a system in which the comparison voltage component and the load current dependent voltage component of the regulating parameter are both derived from the current and are impressed simultaneously. Excessive load current and transients do not arise in the operation of this system because the comparison component becomes available not at the beginning of the half periods of supply but only after the flow of welding current has been initiated. The system may be so set that the amplitudes of the half cycles of welding current which flow during each weld are uniform throughout.

The novel features that I consider characteristic of my invention are set forth with particularity in the appended claims. My invention itself, however, both as to its organization and its method of operation together with additional objects and advantages thereof will be understood from the following description of a specific embodiment when read in connection with the accompanying drawing, in which the single figure is a diagrammatic view showing an embodiment of my invention.

The apparatus shown in the drawing comprises a welding transformer 1 across the secondary 3 of which the material 5 to be welded is held between welding electrodes 7. The primary 9 of the welding transformer is supplied from alternating-current buses 11, preferably of the usual commercial 60-cycle type through a pair of ignitrons 13 and 15 connected in anti-parallel between the source and the primary. Under the ordinary circumstances the nominal voltage of the supply may be of any magnitude between 220 and 2300 volts.

For rendering the ignitrons 13 and 15 conductive a pair of firing thyratrons 17 and 19, respectively, are provided. The firing thyratrons are controlled from a timing circuit 21 and from a phase control circuit 23. A firing thyratron 17 or 19 is rendered conductive on the simultaneous occurrence of two events: an alternating biasing potential from the timing circuit 21 is reduced and a potential of short duration from the phase control circuit 23 is impressed.

The timing circuit includes a start thyratron 25 and a stop thyratron 27. The anodes 29 and 31, respectively, of these thyratrons are connected together and their common junction may be connected to the positive terminal 33 of an auxiliary direct-current supply 34 by the closing of a normally open contact 35 of a push button 37. The cathode 39 of the start thyratron 25 is connected through a control resistor 41 to a fixed intermediate tap 43 of a bleeder 45 across the supply 34. The cathode 47 of the stop thyratron 27 is connected to an adjustable tap 49 of the bleeder 45.

The start thyratron 25 is supplied with control potential from a peaking transformer 51, the secondary 53 of which is connected across a resistor 55. The resistor 55 is connected in series with a bias 57 and another resistor 59 between the control electrode 61 and the cathode 39 of this thyratron. The primary 63 of the transformer 51 is supplied from the main buses 11 through a phase shifting network 65. The potential derived from the peaking transformer 51 is such as to counteract the bias 57. If the start switch 37 is closed, the start thyratron 25 is rendered conductive at an instant determined by the setting of the network 65 in the first positive half period of the source following the closing of the start switch.

Between the control electrode 67 of the stop thyratron 27 and the lower terminal 69 of the bleeder 45 a timing capacitor 71 is connected. This capacitor is charged through a resistor 73 and a normally closed contact 75 of the start switch 37 from the direct-current supply 34. The charge is such that the control electrode 67 of the thyratron 27 is maintained negative with respect to its cathode 47 and the stop thyratron is maintained non-conductive when the switch 37 is closed.

The charge on the capacitor 71 may be counteracted when current flows through the start thyratron 25 since the capacitor is connected to the cathode 39 of the start thyratron through a rectifier 77 and a timing rheostat 79. The rectifier 77 prevents the charge on the capacitor from being dissipated when the start thyratron is non-conductive and the rheostat determines the rate at which the countercharge flows to the capacitor 71 and therefore the time interval required to counteract the negative bias impressed by this capacitor in the control circuit of the stop thyratron 27.

The start and stop thyratrons 25 and 27, respectively, are coupled to the firing thyratrons 17 and 19 through the control resistor 41 and a biasing network 81 in the manner disclosed in a copending application to Edward C. Hartwig, William E. Large and Clarence B. Stadum, Serial No. 702,204, filed October 9, 1946 and assigned to Westinghouse Electric Corporation. This network includes a control transformer 83 having a single primary 85 and a pair of secondaries 87 and 89. The primary 85 is connected between an intermediate tap and a terminal tap of the secondary 91 of a supply transformer 93 through a portion of a rheostat 95. Between the terminal taps of this secondary 91, a pair of thyratrons 99 and 101 is connected in anti-parallel. Between the control electrode 103 and the cathode 105 of the thyratron 99 the control resistor 41 is connected through a bias 107. When the start thyratron 25 is non-conductive the bias 107 maintains this thyratron 99 non-conductive; when the start thyratron 25 conducts, the drop across the resistor 41 causes thyratron 99 to become conductive. The other thyratron 101 of the pair is maintained non-conductive by a negative charge impressed on a pair of capacitors 109 and 111 connected between its control electrode 113 and cathode 115 through the secondary 117 of a biasing transformer 119. This transformer is so wound that the negative potential accumulates on the capacitors 109 and 111 by reason of the flow of current between the control electrode 113 and the cathode 115 during the half periods which the anode potential of the thyratron 101 is negative. This negative charge is counteracted by potential impressed on the capacitor 111 from the rheostat 95 in circuit with the primary 85 of the control transformer 83 when the first thyratron 99 of the pair is rendered conductive.

The secondaries 87 and 89 of the control transformer 83 are connected each between the control electrode 121 and the cathode 123 of a firing tube 17 and 19, respectively, through biases 125 and the secondaries 127 and 129, respectively, of a pulse transformer 131. The connection is such that when the anti-parallel thyratrons 99 and 101 are non-conductive a substantial negative potential is impressed in the control circuits of the firing thyratrons 17 and 19 during the half periods when the respective anode potentials of the firing thyratrons is positive. When the thyratrons 99 and 101 are conductive, they short-circuit the transformer 83 reducing this negative potential substantially. The latter condition exists when current flows through the start tube 25 and when the bias in the control circuit of the thyratron 99 is counteracted, it is rendered conductive. Substantial current then flows through this thyratron and through the rheostat 95. The bias impressed on the capacitors 109 and 111 in the control circuit of the other thyratron 101 is counteracted and the latter is rendered conductive at the beginning of its positive half period. The two thyratrons then continue to conduct so long as the substantial current flows through the resistor 41; the first 99 being rendered conductive positively and the second 101 following.

The firing thyratrons 17 and 19 are not however rendered conductive alone on the reduction of the potential of the control transformer 83. To render the thyratrons 17 and 19 conductive, an impulse of short duration is superimposed from the pulse transformer 131 on the bias potential and the reduced negative control potential in the control circuits of the firing thyratrons. This potential of short duration is derived from the phase control circuit 23.

The circuit 23 includes an input transformer 133, the primary 135 of which is supplied from a current transformer 137 coupled to the primary 9 of the welding transformer 1. The input transformer has two secondaries 139 and 141, respectively, each of which supplies a full-wave rectifier 143 and 145, respectively.

The output potential of the first rectifier 143 is impressed through a rheostat 147 in the input circuits of a pair of thyratrons 149 and 151 connected in push-pull. The control circuits of these thyratrons includes a bias 153 which, in the absence of potential from the rectifier 143, maintains the thyratrons non-conductive. They are rendered conductive by the potential supplied from the first rectifier. The bias 153 is so selected that the thyratrons 149 and 151 are rendered conductive when the current flow through the primary 9 is at its lowest practicable magnitude. The thyratrons are energized from the secondary 155 of a supply transformer 157 provided with an intermediate tap. A capacitor 159 is connected between the intermediate tap and the common junction of the cathode 161 of the thyratrons. A voltage regulator 163 and a rheostat (or voltage divider) 165 are each connected across the capacitor 159. The regulator 163 becomes conductive when the thyratron 149 and 151 becomes conductive and capacitor 159 is charged. The potential across the rheostat 165 is thus maintained at a constant magnitude independently of the current flow through the welding transformer 1 so long as current flows through the transformer. It is to accomplish this object effectively that the push-pull thyratrons 149 and 151 are interposed between the first rectifier 143 and the capacitor 159. The thyratrons conduct sufficient charging current to the capacitor 159 to assure the breakdown of the regulator for small as well as large load currents. This constant magnitude potential across the rheostat 165 serves as a standard of comparison.

The second rectifier 141 is connected to charge a capacitor 167 directly. A second rheostat 169 is connected across the latter capacitor.

The negative plate of the first capacitor 159 is connected directly to the cathode 171 of a high vacuum tube 173. The adjustable tap 175 of the first rheostat 165 is connected to the positive plate of the second capacitor 167. The negative terminal of the second capacitor is connected to the grid 177 of the high vacuum tube through a biasing potential 179.

The anode 181 of the high vacuum tube 173 is connected to the common junction of the cathodes 183 of a pair of thyratrons 185 and 187 through a resistor 189. The control electrodes 191 of the thyratrons are connected each through a pair of resistors 193 and 195 to a conductor 197. The conductor 197 is connected to the cathode 171 of the high vacuum tube 173 through another resistor 199. The anode 201 of the thyratron 185 is connected to one terminal of a secondary winding 203 of a supply transformer 205 through a capacitor 207. The other terminal of the secondary winding 203 is connected to the anode 201 of the other thyratron 187 through the primary 209 of the pulse transformer 131. Rectifiers 211 and 213 are connected across each of the thyratrons 185 and 187, respectively, in such a sense as to conduct current through the other thyratron. Across the other secondary winding 215 of the supply transformer 205 a rheostat 217 and a capacitor 219 are connected in series. The control electrode 191 of the thyratron 187 is connected to an intermediate tap of the secondary winding 215 through its associated resistor 193. The control electrode of the other thyratron 185 is connected through its associated resistor 193 to the junction of the capacitor 219 and the rheostat 217.

An alternating control potential is impressed in the control circuits of the thyratrons 185 and 187 from the secondary winding 215. This potential is displaced in phase with reference to the anode potential impressed from the secondary winding 203 by a magnitude determined by the setting of the rheostat 217. On the control potential a direct-current potenial derived from the high vacuum tube 173 is superimposed. The composite potential thus impressed in the control circuits of the thyratrons 185 and 187 determines the instants in the half periods of the supply when the thyratrons are rendered conductive. Assume that the left-hand thyratron 185 is the first to conduct. A current pulse of short duration then flows through the right-hand rectifier 213 and the primary 209 of the pulse transformer 131 to charge the capacitor 207. A pulse of short duration is induced in the secondary circuit of one of the firing thyratrons 17 or 19 which has the proper polarity to fire this thyratron. However, this thyratron is only fired if its negative potential derived from the control transformer 83 is small. When the right-hand thyratron 187 is rendered conductive during the succeeding half period of the potential supplied by the transformer 205, a current pulse of short duration flows through the left-hand rectifier 211 to discharge and recharge the capacitor 207 to the opposite polarity. A pulse of the proper polarity is now induced in the control circuit of the other firing thyratron 19 or 17 to fire it. The ignitrons 13 and 15 are fired immediately after the firing of the corresponding thyratrons 17 and 19.

The instants when the ignitrons 13 and 15 are fired is thus determined by the setting of the rheostat 217 and by the magnitude of the potential derived from the anode circuit of the high vacuum tube 173. In accordance with the preferred practice of my invention, the rheostat 217 should be so set for the welding of any material that the ignitrons are fired at the proper instants in the half periods of the supply when the potential derived from the high vacuum tube 173 is zero. This object may be accomplished by conducting a few test welds before welding a material and by setting the rheostat 217 and the rheostats 169 and 165 in the rectifier and push-pull thyratron circuits for attainment of satisfactory welds as determined by the test welds. To aid in setting these rheostats a voltmeter 221 or other similar instrument is connected across the output terminals of the high vacuum tube circuit 223 and 225. With the rheostat 217 in the secondary winding set so that proper welds are produced when the direct-current potential 223—225 is zero, the current flow through the welding transformer 1 during each half period of each welding interval has the same amplitude. If the rheostat 217 is not set precisely, the amplitude of the current flow through the welding transformer during the first half period of each welding interval differs from the current flow during the others. That the unbalanced condition exists during any welding operation is indicated on the meter 221. When this indication appears, the operator may reset the rheostat 217 so that the meter reading is reduced to zero. In the practice of my invention, the difference in amplitude between the first and the later cycles of each weld may thus be maintained so small as to be of no importance.

To initiate the operation of the system, the manual switch 37 is closed. The charging circuit for the timing capacitor is opened at the now open contact 75 of the switch. The anode circuits for the on and off thyratrons 25 and 27 are closed at the now closed contact 35. The on thyratron 25 becomes conductive at an instant in the half period of the supply predetermined by the setting of the network 65 in series with a saturable transformer 51. The off thyratron 27 is biased to non-conductivity by the timing capacitor 71. The on thyratron 25 conducts current through the control resistor 41 and the positively controlled thyratron 99 is rendered conductive during the half periods of the supply when its anode is positive. During the intervening half periods when the anode potential of the following thyratron 101 is positive, it becomes conductive. The two thyratrons 99 and 101 continue to conduct and short out the primary 85 of the control transformer 83 so long as the on thyratron 25 is conductive.

When the negative potential supplied by the control transformers 83 in the control circuits of the firing thyratrons 17 and 19 is reduced by the short circuiting effect of the thyratrons 99 and 101, the firing thyratrons may be rendered conductive by the short duration potentials derived through the pulse transformer 131. The first of these potentials during a series of welds is impressed at an instant predetermined by the setting of the rheostat 217. One of the firing thyratrons 17 or 19 and its associated ignitron 13 or 15 are rendered conductive at an instant predetermined by this setting and current flows through the primary 9 of the welding transformer 1 inducing a potential in the load current responsive transformer 133. Potentials are now impressed across the rheostats 165 and 169; one of these potentials predetermined by the selection of the regulator tube 163 is of standard magnitude, the other varies with the load current. The first potential (165) is in such a sense as to increase the conductivity of the high vacuum tube 173 and the second (169) in such a sense as to decrease this conductivity. If the presetting is correct, these potentials are equal. The welding operation then continues, the ignitrons 13 and 15 being rendered conductive in their turn during the successive half periods of the supply at instants predetermined by the setting of the rheostat 217.

The ignitrons continue to conduct for an interval predetermined by the timing rheostat 79 and the timing capacitor 71. After a time interval predetermined by the setting of these components, the capacitor 71 is charged by the current flow through the on thyratron 25 to a potential such that the off thyratron 27 becomes conductive. The off thyratron then shunts out the on thyratron and reduces its anode current flow to a magnitude such that the bias in the control circuit of the leading thyratron 99 is no longer counteracted. The leading thyratron is now rendered non-conductive and the following thyratron 101 then becomes non-conductive. The short duration potential derived from the pulse transformer 131 is now insufficient to render the firing thyratrons 17 and 19 conductive and the flow of welding current is interrupted. Another weld may be produced by opening and reclosing the push button.

If initially or during the welding operation, the potential derived from the rheostats 165 and 169 differs, the conductivity of the high vacuum tube 173 increases or decreases. Under such circumstance the phase at which the thyratrons 185 and 187 are rendered conductive is shifted in accordance with the shift in the conductivity of the high vacuum tube. The reading of the meter 221 then varies from zero and the rheostat 217 may be reset by the operator. For example, if by reason of an increase in supply voltage 11 or a decrease in the resistance of the material 5 at the welding joint, the welding current increases, the potential drop across the second rheostat increases correspondingly. Under such circumstances, the net control potential impressed on the high vacuum tube 173 becomes more negative and the conductivity of the tube decreases. The potential of the cathodes 183 of the thyratrons 185 and 187, which are connected to the anode 181 of the tube, are then increased and these thyratrons and, therefore, the ignitrons 13 and 15 are rendered conductive later in the half periods than initially. The indicator 221 reading now deviates from zero and the operator may reset the rheostat 217 in the control circuit of the thyratrons so that the reading is reduced to zero.

The disclosed embodiment of my invention may be modified without departing from its broader scope. Under certain circumstances, the welding current is so small that thyratrons may supply it. Under such circumstances, the welding current is supplied directly from the thyratrons 17 and 19 or from larger thyratrons controlled from the latter. In certain situations any or all of the thyratrons 25, 27, 99, 101, 149, 151, 185 and 187 may be high vacuum tubes or even magnetic amplifiers; under certain circumstances the tube 173 may also be a magnetic amplifier.

Although I have shown a specific embodiment of my invention, I am fully aware that many modifications thereof are possible. My invention, therefore, is not to be restricted except insofar as is necessitated by the prior art and by the spirit of the appended claims.

I claim as my invention:

1. Apparatus for supplying a load intermittently from a source comprising, in combination, coupling means to be applied to said load for deriving power only when said load is supplied, first means connected to said coupling for deriving a first potential of substantially constant magnitude, second means connected to said coupling for deriving a second potential which is proportional to load current and third means to be connected between said first and second means and said load, for controlling the current flow through said load in accordance with the relationship between said first and second potentials.

2. Apparatus for supplying power from a source to a load which requires power only for predetermined intervals interposed between predetermined quiescent intervals comprising, in combination, a controllable valve connected between said load and said source for controlling the flow of current from said source to said load, coupling means connected to derive power proportional to load current, when said load is being supplied with current, first means connected to said coupling means for deriving a first potential of predetermined magnitude, second means connected to said coupling means for deriving a second potential proportional to the current flow through said load and third means connected between said first and second means and said valve for controlling the current flow through said load in accordance with the relationship of said first and second potentials.

3. Apparatus for supplying power from a source to a load which requires power only for predetermined intervals interposed between predetermined quiescent intervals comprising, in combination, a controllable valve connected between said load and said source for controlling the flow of current from said source to said load, coupling means connected to derive power proportional to load current only when said load is being supplied with current, first means connected to said coupling for deriving a first potential of predetermined magnitude, second means connected to said coupling for deriving a second potential proportional to the current flow through said load, and third means connected between said first and second means and said valve for controlling said valve to vary the current flow through said load directly with the algebraic difference between said first and second potentials.

4. In combination an electric discharge device having input and output terminals, means coupled to said output terminals for deriving power when said valve is conductive, first means connected to said coupled means for deriving a first potential of predetermined magnitude, second means connected to said coupled means for deriving a second potential which is proportional to current flow in said output terminals, third means connected between said first and second means and said input terminals for controlling the conductivity of said electric discharge device in accordance with the relationship between said first and second potentials.

5. In combination an electric discharge device having input and output terminals, means coupled to said output terminals for deriving power when said valve is conductive, first means connected to said coupled means for deriving a first potential of predetermined magnitude, second means connected to said coupled means for deriving a second potential proportional to the magnitude of the current flow through said valve, third means connected between said first and second means and said input terminals for controlling the conductivity of said discharge device in accordance with the relationship between said first and second potentials.

6. In combination, a first ignitron having an anode and a cathode, an input network connected between said anode and cathode, a second ignitron having an anode and a cathode, an input network connected between said anode and cathode, a first conductor connected to the anode of the first ignitron and the cathode of the second, a second conductor connected to the anode of the second ignitron and the cathode of the first, means coupled to said second conductor for deriving power when current flows through said ignitrons, first means connected to said coupling for deriving a first potential of substantially constant magnitude, second means connected to said coupling for deriving a second potential which is proportional to current flow through said second conductor, and third means connected between said first and second means and said input networks for varying the current flow through said ignitrons in accordance with the relationship of said first and second potentials.

7. In combination, a first conductor for connection to a source, a second conductor for connection to a load, a first discharge path having an anode and a cathode, a second discharge path having an anode and a cathode, connections between the anode of the first path, the cathode of the second path and said first conductor, connections between the anode of the second path, the cathode of the first path and said second conductor, means coupled to said second conductor for deriving power when current flows therethrough, first means connected to said coupling to derive a first potential of substantially constant magnitude, second means connected to said coupling to derive a second potential which is proportional to current flow in said second conductor, and third means connected between said first and second means and said discharge paths for varying the current flow through said second conductor in accordance with the relationship between said first and second potentials.

8. In combination, a first conductor for connection to a source, a second conductor for connection to a load, a first discharge path having an anode and a cathode, a second discharge path having an anode and a cathode, connections between the anode of the first path, the cathode of the second path and said first conductor, connections between the anode of the second path, the cathode of the first path and said second conductor, means coupled to said second conductor for deriving power when current flows therethrough, first means connected to said coupled means to derive a first potential, said first means including a regulator for maintaining said first potential at a predetermined magnitude, second means connected to said coupled means to derive a second potential which is proportional to current flow in said second conductor and third means connected between said first and second means and said discharge paths for varying the current flow through said second conductor in accordance with the relationship between said first and second potentials.

9. In combination, a first conductor for connection to a source, a second conductor for connection to a load, a first discharge path having an anode and a cathode, a second discharge path having an anode and a cathode, connections between the anode of the first path, the cathode of the second path and said first conductor, connections between the anode of the second path, the cathode of the first path and said second conductor, means coupled to said second conductor for deriving power when current flows therethrough, an auxiliary electric discharge network having input and output circuits, first means connected between said coupled means and said input circuit for causing current to flow through, and a first potential to be produced in said output circuit when current flows through said second conductor, second means connected between said coupled means and said input circuit for causing current to flow through, and a second potential to be produced in said output circuit when current flows through said second conductor, and means connected between said output circuit and said discharge paths for varying the current flow through said second conductor in accordance with the relationship between said first and second potentials.

10. In combination, a first conductor for connection to a source, a second conductor for connection to a load, a first discharge path having an anode and a cathode, a second discharge path having an anode and a cathode, connections between the anode of the first path, the cathode of the second path and said first conductor, connections between the anode of the second path, the cathode of the first path and said second conductor, means coupled to said second conductor for deriving power when current flows therethrough, first means connected to said coupled means, including a capacitor to be charged to a first predetermined potential when current flows through said second conductor, second means connected to said coupled means including a capacitor to be charged to a second potential when current flows through said second conductor, said second potential being proportional to the magnitude of current flow through said second conductor and third means connected between said first and second means and said discharge paths for varying the current flow through said second conductor in accordance with the relationship between said first and second potentials.

11. In combination, a first conductor for connection to a source, a second conductor for connection to a load, a first discharge path having an anode and a cathode, a second discharge path having an anode and a cathode, connections between the anode of the first path, the cathode of the second path and said first conductor, connections between the anode of the second path, the cathode of the first path and said second conductor, means coupled to said second conductor for deriving power when current flows therethrough, first means connected to said coupled means including a capacitor to be charged to a first potential when current flows through said second conductor, a voltage regulator connected across said capacitor, second means connected to said coupled means including a capacitor to be charged to a second potential which is dependent upon the magnitude of current flow in said second conductor when current flows through said conductor, and third means connected between said first and second means and said discharge paths for varying the current flow through said second conductor in accordance with the relationship between said first and second potentials.

12. In combination, a first conductor for connection to a source, a second conductor for connection to a load, a first discharge path having an anode and a cathode, a second discharge path having an anode and a cathode, connections between the anode of the first path, the cathode of the second path and said first conductor, connections between the anode of the second path, the cathode of the first path and said second conductor, means coupled to said second conductor for deriving power when current flows therethrough, first means connected to said coupled means including a capacitor to be charged to a first potential when current flows through said second conductor, a voltage regulator connected across said capacitor, said regulator being of the type which becomes conductive at a voltage corresponding to the lowest current flow anticipated through said second conductor, second means connected to said coupled means including a capacitor to be charged to a second potential when current flows through said conductor, and third means connected between said first and second means and said discharge paths for varying the current flow through said second conductor in accordance with the relationship between said first and second potentials.

13. In combination, a first conductor for connection to a source, a second conductor for connection to a load, a first discharge path having an anode and a cathode, a second discharge path having an anode and a cathode, connections between the anode of the first path, the cathode of the second path and said first conductor, connections between the anode of the second path, the cathode of the first path and said second conductor, means coupled to said second conductor for deriving a potential when current flows therethrough, said means including a capacitor to be charged when current flows through said second conductor and a voltage regulator connected across said capacitor, said regulator being of the type that becomes conductive to a potential corresponding to the lowest current flow anticipated through said second conductor.

14. In combination, a first conductor for connection to a source, a second conductor for connection to a load, a first discharge path having an anode and a cathode, a second discharge path having an anode and a cathode, connections between the anode of the first path, the cathode of the second path and said first conductor, connections between the anode of the second path, the cathode of the first path and said second conductor, means coupled to said second conductor for deriving power when current flows therethrough, first means connected to said coupled means to derive a first potential of predetermined magnitude, said first means including a capacitor to be charged when current flows through said second conductor, a voltage regulator connected across said capacitor, said regulator being of the type that becomes conductive to a potential corresponding to the lowest current flow anticipated through said second conductor and a variable voltage divider connected across said capacitor, and second means connected to said coupled means to derive a second potential which is proportional to the current in said second conductor and third means connected between said first and second means and said discharge paths for varying the current flow in said second conductor in accordance with the relationship of said first and second potentials.

15. Apparatus for supplying a load intermittently from a source comprising, in combination, conductors connecting said load to said source, coupling means to be applied to said conductors for deriving a potential proportional to load current only when current flows through said conductors, and a regulator connected in circuit with said coupling means for maintaining said potential at a predetermined magnitude independent of the current flow through said conductors.

16. Apparatus for supplying a load intermittently from a source comprising, in combination, conductors connecting said load to said source, coupling means to be applied to said conductors for deriving a potential proportional to load current when current flows through said conductors, a capacitor to be charged when potential is derived in circuit with said coupling means and a regulator connected across said capacitor.

17. Apparatus for supplying a load intermittently from a source comprising, in combination, conductors connecting said load to said source, coupling means to be applied to said conductors for deriving a potential proportional to load current when current flows through said conductors, a capacitor to be charged when potential is derived in circuit with said coupling means, a regulator connected across said capacitor and a variable voltage divider connected across said regulator.

18. Apparatus for supplying a load that is to be supplied intermittently from a source comprising, in combination, conductors connecting said load to said source, a coupling means to be applied to said conductors for deriving a potential proportional to load current when current flows through said conductors, a capacitor to be charged when potential is derived in circuit with said coupling means, a regulator connected across said capacitor and a variable voltage divider connected across said regulator, said regulator being of the type which becomes conductive at a potential across said capacitor corresponding to the lowest anticipated load current.

19. In combination, a first conductor for connection to a source of alternating current, a second conductor for connection to a load, a first discharge path having an anode and a cathode, a second discharge path having an anode and a cathode, connections between the anode of the first path, the cathode of the second path and said first conductor, connections between the anode of the second path, the cathode of the first path and said second conductor, means coupled to said second conductor for deriving power when current flows therethrough, first means connected to said coupled means to derive a first potential, second means connected to said coupled means to derive a second potential and third means connected between said first and second means and said discharge paths for varying the instants in the half periods of said source when said paths are rendered conductive, in accordance with the relationship between said first and second potentials.

20. Apparatus for supplying a load from a source comprising, in combination, means coupled to said load for deriving power only when said load is supplied, first means connected to said coupled means deriving a first potential of predetermined magnitude, second means connected to said coupled means for deriving a second potential which is proportional to load current, third means connected between said first and second means and said load for controlling the current flow through said load in accordance with the relationship between said first and second potentials, and an indicator for indicating the relationship between said first and second potentials.

21. In combination source terminals adapted for connection to a source of alternating current, load terminals adapted for connection to a load, load conductors connecting said source terminals to said load terminals, switch means interposed in circuit with said load conductors for controlling the supply of power through said load conductors, coupling means for deriving a parameter which is proportional to the power flow through said load conductors, first means for deriving a substantially constant parameter from said coupling means, second means for deriving a parameter from said coupling means which is proportional to the power flow through said load conductors, means connected between said first and second means for comparison of said last mentioned parameters, and means connected between said last mentioned means and said switch for operating said switch to control the flow of power through said load conductors in accordance with the relationship between the parameters derived from said coupling means.

EDWARD C. HARTWIG.

REFERENCES CITED

The following references are of record in the file of this patent:

UNITED STATES PATENTS

| Number | Name | Date |
| --- | --- | --- |
| 2,372,068 | Faulk | Mar. 20, 1945 |
| 2,372,129 | Smith | Mar. 20, 1945 |
| 2,406,429 | Mahoney | Aug. 27, 1946 |
| 2,421,994 | Cooper | June 10, 1947 |
| 2,431,248 | Hartwig | Nov. 18, 1947 |